United States Patent [19]

Sciammarella

[11] Patent Number: 6,081,266
[45] Date of Patent: *Jun. 27, 2000

[54] INTERACTIVE CONTROL OF AUDIO OUTPUTS ON A DISPLAY SCREEN

[75] Inventor: Eduardo Sciammarella, New York, N.Y.

[73] Assignees: Sony Corporation, Tokyo, Japan; Sony Electronics, Inc., Park Ridge, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/845,072

[22] Filed: Apr. 21, 1997

[51] Int. Cl.[7] ............................................ G06F 3/00
[52] U.S. Cl. ................................ 345/341; 345/349
[58] Field of Search ................................ 345/326–358, 345/968, 970, 978, 974

[56] References Cited

U.S. PATENT DOCUMENTS

| | | | |
|---|---|---|---|
| 5,428,730 | 6/1995 | Baker et al. | 345/328 |
| 5,542,039 | 7/1996 | Brinson et al. | 345/978 X |
| 5,559,301 | 9/1996 | Bryan, Jr. et al. | 84/653 |
| 5,594,469 | 1/1997 | Freeman et al. | 345/327 |
| 5,640,176 | 6/1997 | Mundt et al. | 345/348 X |
| 5,657,221 | 8/1997 | Warman et al. | 345/348 X |
| 5,659,691 | 8/1997 | Durward et al. | 345/978 X |
| 5,666,504 | 9/1997 | Crutcher | 345/978 X |
| 5,680,534 | 10/1997 | Yamato et al. | 345/978 X |
| 5,680,619 | 10/1997 | Gudmundson et al. | 345/978 X |
| 5,684,259 | 11/1997 | Horii | 84/600 |
| 5,715,412 | 2/1998 | Aritsuka et al. | 345/978 X |
| 5,740,436 | 4/1998 | Davis et al. | 345/978 X |
| 5,771,041 | 6/1998 | Small | 345/978 X |
| 5,812,688 | 9/1998 | Gibson | 345/978 X |

FOREIGN PATENT DOCUMENTS

| | | | |
|---|---|---|---|
| WO 97/13497 | 9/1991 | WIPO | H04B 1/00 |
| WO 97/03433 | 1/1997 | WIPO | G09G 5/00 |
| WO 97/26964 | 7/1997 | WIPO | A63H 5/00 |

*Primary Examiner*—Steven Sax
*Attorney, Agent, or Firm*—Frommer Lawerence & Haug, LLP; William S. Frommer

[57] ABSTRACT

Audio outputs representing various sounds are displayed on a screen as graphical objects. The user manipulates the size or location of the object on the screen such that the corresponding audio output is modified accordingly. If, for example, the size of the graphical object is increased, the sound becomes louder; conversely, if the graphical object is decreased, the sound becomes softer. By further moving the graphical object between the left and right edges of the screen, the audio balance between the channels is modified. If the object is moved to the left of the screen, only the left audio output channel is enabled. Conversely, only the right audio output channel is enabled if the graphical object is moved to the right side of the screen.

16 Claims, 7 Drawing Sheets

INTERACTIVE CONTROL OF AUDIO OUTPUTS ON A DISPLAY SCREEN

BACKGROUND OF THE INVENTION

The present invention is related to a Graphical User Interface (GUI) and, in particular, a method for interactively and visually controlling various audible sounds, reproduced via a system which may be stand-alone or attached to a computer, by manipulating on a display screen graphical objects correspondingly representing the sources of those audible sounds.

A personal computer connected to an audio system is increasingly becoming a popular tool for creating music for sophisticated musicians and occasional would-be composers alike. Many of the current applications for creating music on a computer, however, tend to imitate existing physical hardware and are mostly directed to people with some working knowledge of music composition, various instruments, music notes, etc. For those people who are musically challenged, these applications may be too complex or cumbersome to use.

For example, music mixers are commonly imitated on a computer using software applications as a way to mix music. The level of sophistication required to operate an actual music mixer, however, is typically carried over into these software applications. As a result, these applications end up being very difficult to use by a music novice, for example.

OBJECTS OF THE INVENTION

It is an object of the present invention to control audio outputs of a system via graphical objects representing those audio outputs as displayed on a screen.

It is another object of the present invention to visually indicate a change in the audio output level by manipulating the corresponding graphical object on the screen.

It is a further object of the present invention to visually indicate a change in the audio output balance between different audio channels by manipulating the corresponding graphical object on the screen.

It is still another object of the present invention to create a musical composition by manipulating on the screen graphical objects representing various audio outputs of the system.

SUMMARY OF THE INVENTION

These and other objects, features and advantages are accomplished by an apparatus and method for controlling on a display screen a plurality of audio outputs corresponding to a plurality of graphical objects which represent the audio outputs. The inventive apparatus includes a controllable processor programmed to select on the display screen a respective graphical object corresponding to a desired audio output, and to manipulate the selected graphical object such that the respective audio output is modified in correspondence with the manipulation of the selected graphical object.

In accordance with one aspect of the present invention, a graphical object is selected on the screen and its size modified such that an audio output level is changed in correspondence with the modification in size.

In accordance with another aspect of the present invention, the selected graphical object is moved on the display screen between a first and second locations such that the size of the selected graphical object is continuously modified while the selected graphical object is being moved by the user.

In accordance with still another aspect of the present invention, a graphical representation of multiple audio output levels corresponding to the audio outputs is displayed on the screen. A graphical object is then selected and displaced between various audio output levels on the screen such that an audio output level is changed in correspondence with the object's movement.

In accordance with yet another aspect of the present invention, the graphical object is moved between left and right edges of the screen such that an audio output balance changes between a left and right channel in correspondence with the object's movement.

BRIEF DESCRIPTION OF THE DRAWINGS

The above-mentioned as well as additional objects, features and advantages of the present invention will become readily apparent from the following detailed description thereof which is to be read in conjunction with the accompanying drawings, in which.

In all Figures, like reference numerals represent the same or identical components of the present invention.

DETAILED DESCRIPTION OF THE PREFERRED EMBODIMENTS

The following description provides a general overview of the present invention.

The present invention allows visualization, on a display screen, of an audible sound displayed in a form of a graphical object. This graphical object may be a static or a moving image and may represent any sound reproduced via a local or remote system, either stand-alone or attached to a computer: a musical composition including a single or multiple instruments, a song, bird chirping, telephone ringing, etc. By manipulating a particular feature and/or location of this graphical object on the screen via an input device such as a mouse, lightpen, keyboard, etc., the sound via the system is modified in accordance with the user manipulation.

The present invention will now be explained in detail with reference to the accompanying drawings.

Figure 1:
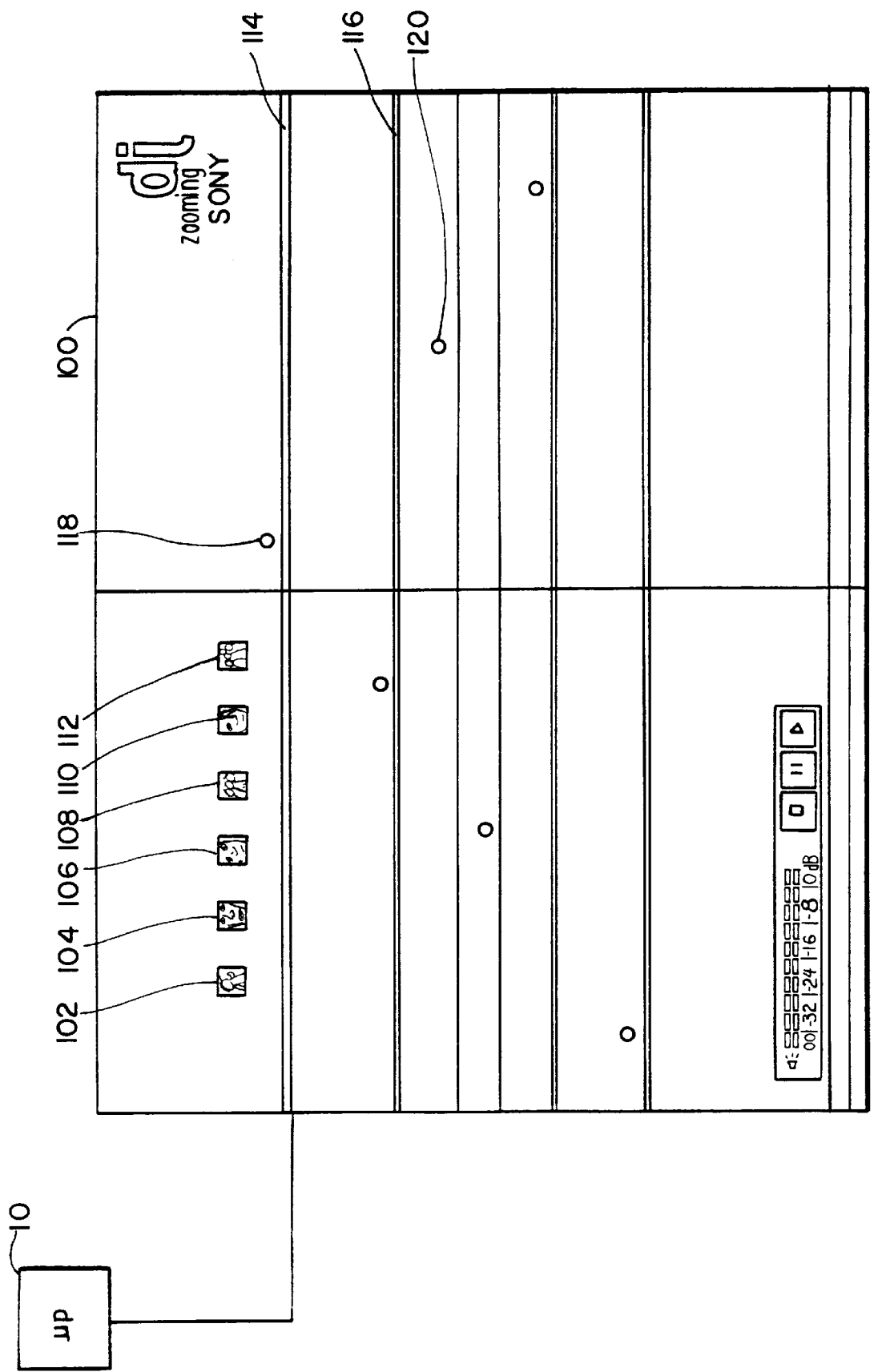
FIG. 1 is a display screen of various graphical objects representing audio outputs in accordance with the present invention.

FIG. 1 shows display screen 100 of a computer system having an input device (not shown), such as a mouse, lightpen or keyboard to manipulate images on the screen. As illustrated in FIG. 1, various graphical objects are displayed on the screen 100.

In particular, graphical objects 102, 104, 106, 108, 110 and 112 are each exemplarily shown in the form of a square displayed at the top of the screen. Each graphical object contains an image located within the outline of the square, which represents an audible sound. The images are preferably created in such a way as to help the user identify the sound controlled by that graphical object. The sound may be reproduced via a system connected to the computer system, for example, as known in the art. Since the system may be local or remote with respect to the user, the reproduced sound can be audible to the user or to a listener being at a different location from that user.

Initially, the graphical objects are represented on the screen in such a way that the output from each audio source is either muted (i.e., disabled) so that each sound is inaudible to the listener.

According to the first embodiment of the present invention, the size of a graphical object determines the volume of an audible sound represented by that object. Initially each graphical object has a small size indicating to the user that the sound is turned off. As shown in FIG. 1, for example, the initial size of the graphical object is selected to be small enough to allow multiple objects to appear on the screen. At the same time, however, the object must not be so small as to prevent the user from discerning an image within the object which identifies the sound.

In operation, to change the volume of a particular sound produced by the system, the corresponding object is selected on the screen using an input device, for example, and the object's size is then changed accordingly. For example, the object may be pointed out on the screen using a cursor controlled by a mouse. The selected graphical object is then modified such that the volume of the audio output represented by that selected object is changed in correspondence with its modification in size. That is, the larger the graphical object, the louder the sound and, conversely, the smaller the graphical object, the softer the sound.

Figure 2:
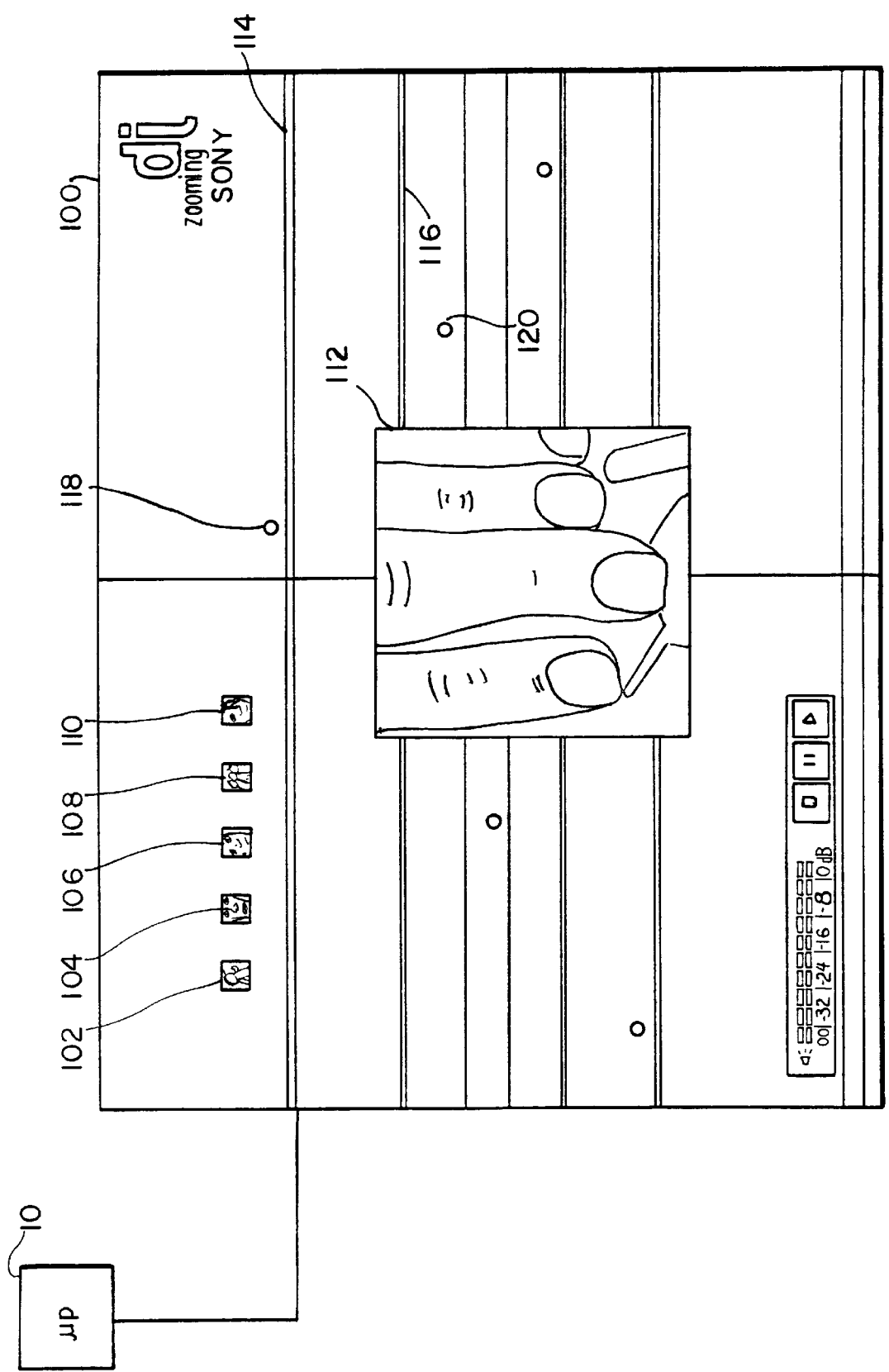
FIG. 2 is a display screen of one particular graphical object being enlarged such that the corresponding audio output level is increased.

FIG. 2 shows the screen 100 where the graphical object 112, representing for example the sound of "drumming fingers", is enlarged such that the volume is increased. The object—and correspondingly the volume of the sound represented by it—is increased via the input device: a button on the mouse, for example, is continuously "clicked" or held down to effect the size enlargement. The volume of the sound keeps increasing in correspondence with the user operation of making the graphical object larger. The maximum size of the object appearing on the screen may be calibrated to correspond to a predetermined maximum audio level. Namely, if the maximum size is reached, further attempts by the user to enlarge the graphical object will be ineffectual, since the predetermined maximum audio level has been reached, as visually represented by that object's size. Other audio outputs represented by the corresponding graphical objects 102, 104, 106, 108 and 110 in FIG. 2 remain disabled, but, of course, can be changed in a manner described above.

Conversely, the volume of the "drumming fingers" sound may be decreased from any level by reducing the graphical object 112. The volume keeps decreasing continuously as long as the user makes the graphical object 112 smaller on the screen. Once, however, a predetermined minimum audio level has been reached, the user can no longer decrease the graphical object 112, which visually indicates the minimum audio level on the screen.

Thus, by zooming in and out of the object, i.e., manipulating its size directly on the screen, the audio level is changed dynamically based on the visual representation to the user.

FIGS. 1–5 also show a graphical representation of various audio levels, as indicated by exemplary horizontal lines 114, 116, etc., and alphanumeric labels 118, 120, etc. In a second embodiment of the present invention, a graphical object, such as 104 or 110, is selected via the input device. The selected object is then moved vertically to a location on the screen to set the audio output represented by that graphical object to a desired level without changing the object's size.

Figure 3:
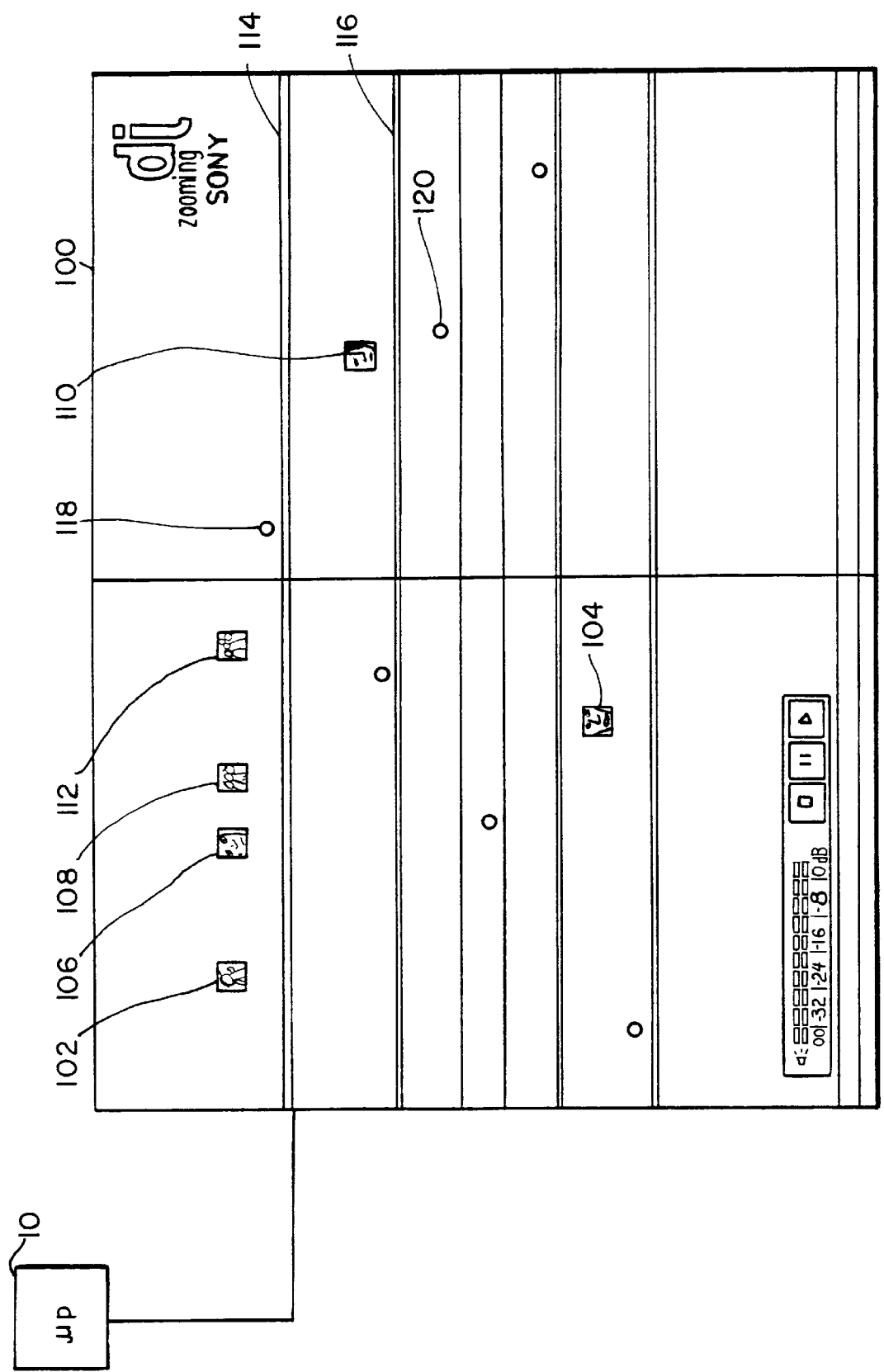
FIG. 3 is a display screen of two graphical objects being moved to an "audible" region such that the corresponding audio output levels are increased accordingly.

As shown in FIG. 3, the graphical object 104 representing a vocal, for example, as determined from its image is moved to an almost maximum audio level, while maintaining the original size. Similarly, the graphical object 110 representing another vocal, for example, is slightly displaced—with respect to the vertical direction on the screen—to make that vocal a little bit louder. As further illustrated in FIG. 3, the graphical objects 102, 106, 108 and 112 are positioned outside the audible level: the audio outputs as represented by these objects are disabled since these objects are located outside the minimum audio level (i.e., the horizontal line 114).

It is understood, of course, that the audio output levels and the direction for turning the volume up or down may be reversed as compared with FIG. 3. That is, by moving the object up—with respect to the screen display as viewed by the user—the audio level is increased, and vice versa. Furthermore, the object's movement beyond some predetermined horizontal lines is not allowed to visually indicate that the maximum/minimum audio output levels have been reached.

A third embodiment of the present invention is the combination of the first and second embodiments. Namely, the audio output level changes as the user moves, on the display screen, the corresponding graphical object in a vertical direction, such that the size of the object changes in accordance with the movement. As illustrated in FIG. 2, for example, in this embodiment of the present invention, the graphical object 112 is moved from the "inaudible" area above the line 114 of FIG. 1, to a new location past the line 114. As the user "drags" the graphical object 112 down in a vertical direction on the screen, the object's size increases. As a result of the user manipulation, the corresponding sound becoming louder as long as that object is moved, thereby increasing its size. Of course, moving the object in the opposite direction has the opposite effect: the sound becomes softer until it becomes inaudible past the line 114.

Figure 4:
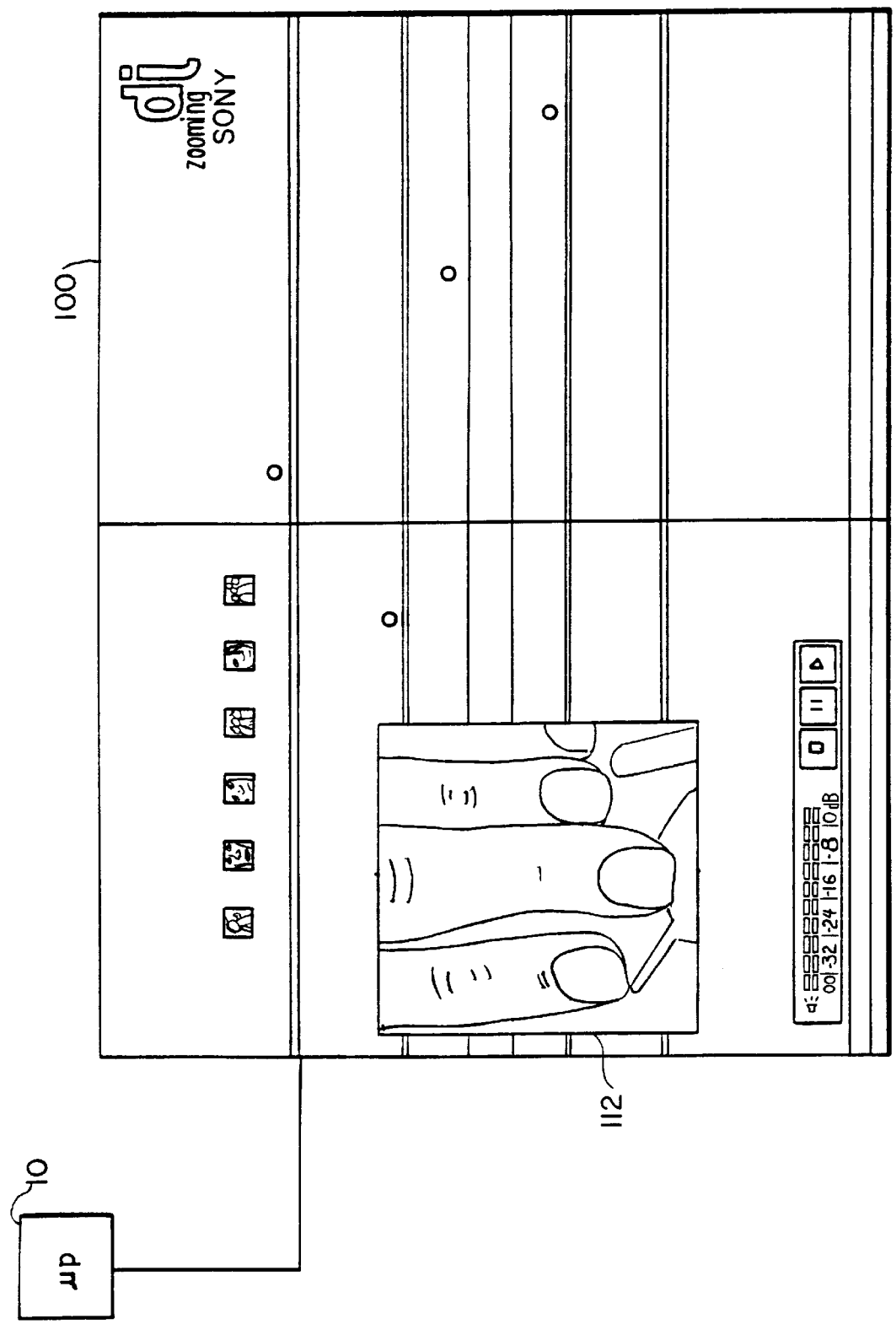
FIG. 4 is a display screen of an enlarged graphical object moved to the left side of the screen such that the corresponding audio output is enabled only from the left channel.
Figure 5:
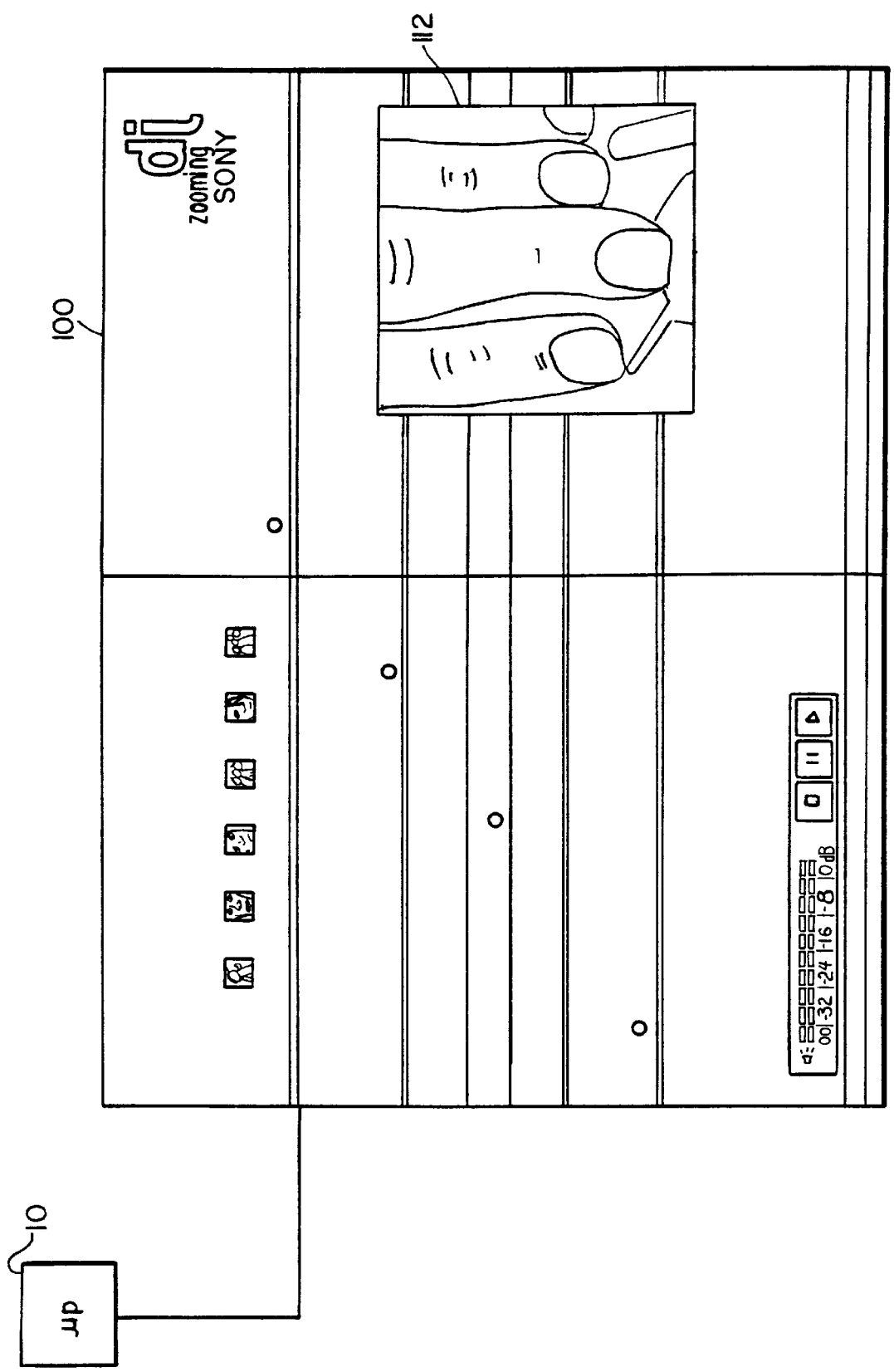
FIG. 5 is a display screen of an enlarged graphical object moved to the right side of the screen such that the corresponding audio output is enabled only from the right channel.

A fourth embodiment of the present invention is explained with reference to FIGS. 4 and 5. According to this embodiment, an audio output balance between left and right channels, for example, can be changed by manipulating the position of the graphical object on the display screen. After being selected, the graphical object 112 is enlarged such that the audio output level increases from its "silent" level, and while the audio sound is audible, the graphical object 112 is moved, via the input device, for example, to the left side of the screen 100, as shown in FIG. 4. The movement to the left, with the reference point being the screen center, enables the audio output through the left channel only.

By analogy, when the user moves the graphical object to the right side of the screen 100, only the audio output through the right channel is enabled. This situation is representatively shown in FIG. 5.

Hence, if the system can output stereo sound, the left (right) position of the graphical object on the display screen corresponds to the left (right) channel of the audio output. A graphical object that is displayed on the right side of the screen will only be heard through the right channel. Furthermore, with 3-D sound system, the center of the display screen represents the listener (user) such that the position of any graphical object with respect to the center point corresponds to a 3-D location of that sound. As with the size, the location of the graphical object arid the sound which it represents can be manipulated on the screen directly and dynamically.

Figure 6:
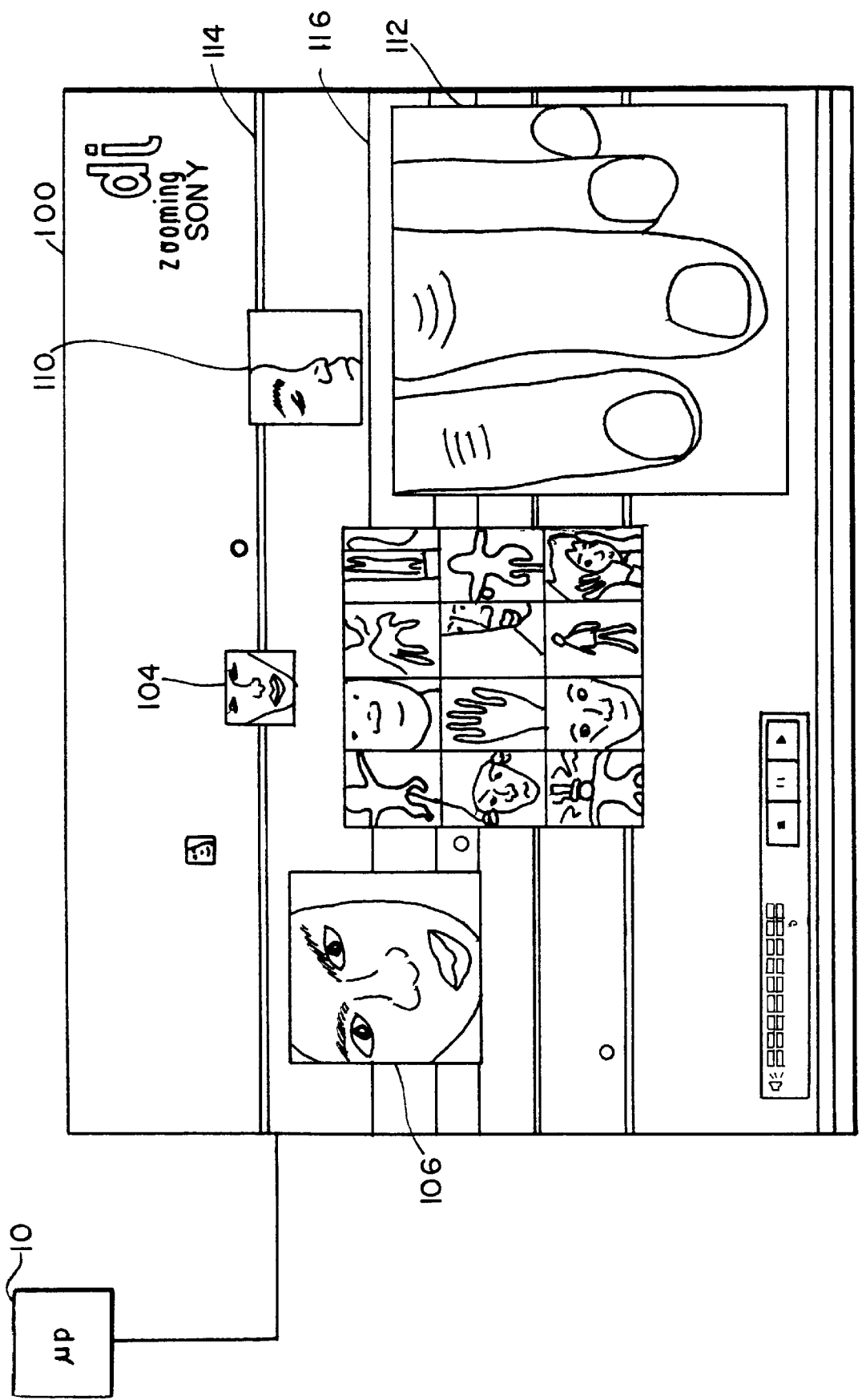
FIG. 6 is a display screen of multiple graphical objects corresponding to audio sources at various audio output levels and with various output channels enabled and disabled, such that a musical composition is created.

One application of the present invention includes mixing these graphical objects representing different audio outputs to create a musical composition, as illustrated in FIG. 6. Each graphical object represents, for example, a single element of a composition, and by "layering" these audio outputs a full composition can be easily obtained even by a novice.

The composition can also be easily rearranged by dynamically changing the size and location of each object on the screen, thereby modifying the corresponding sounds as described above. Furthermore, the created or modified composition can be recorded and then played back. During the playback operation, all of the objects change their sizes and locations according to the user manipulation during the recording process.

While the present invention can be used by a single user creating a composition, it can also be a collaborative effort among many people. For example, members of the Internet club may want to "jam" together, where each member manipulates a separate graphical object.

Figure 7:
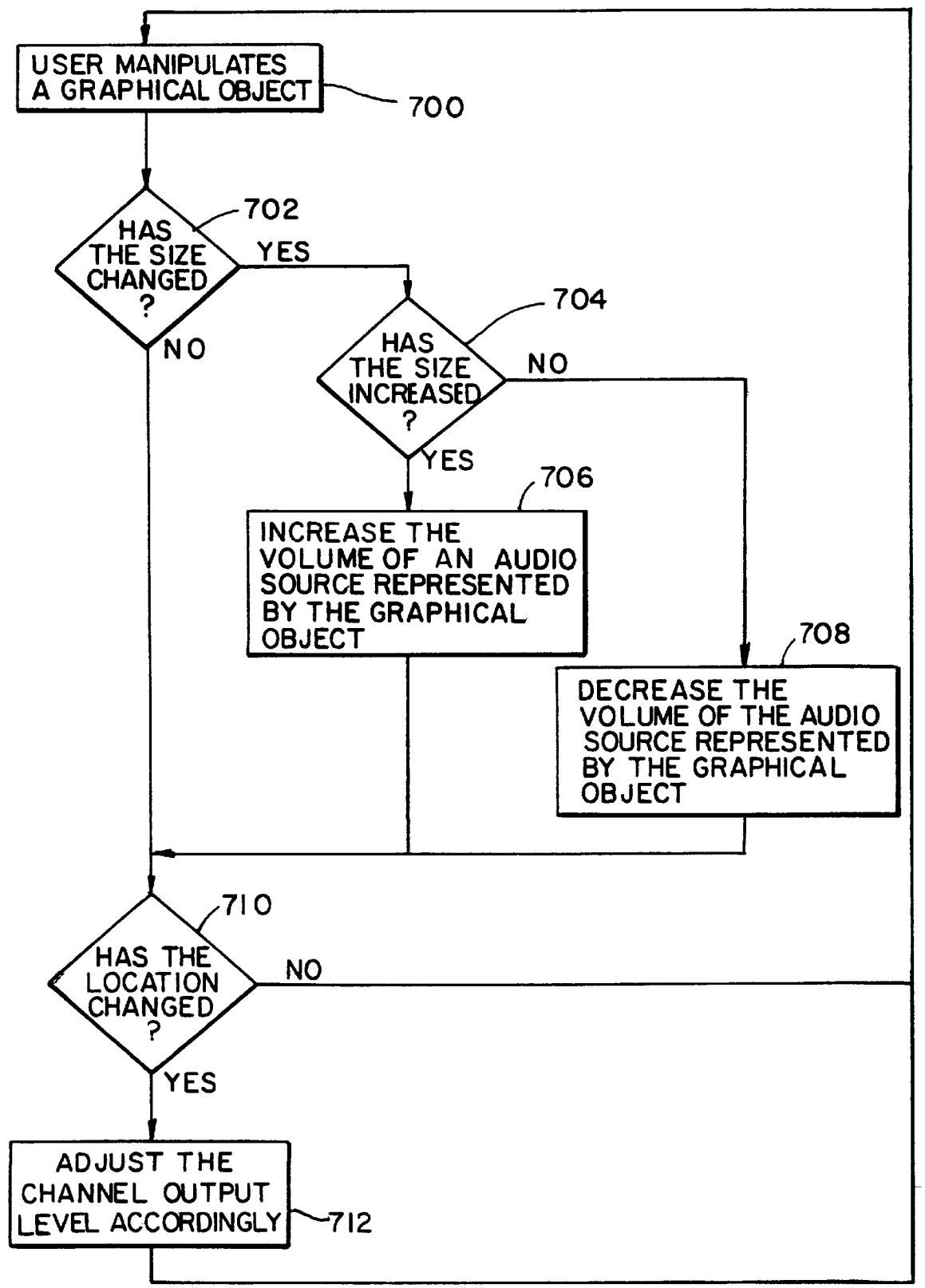
FIG. 7 is a sequencing flowchart detailing the steps of the present invention.

FIG. 7 is a sequencing flowchart detailing the steps of the present invention. In step 700, the user manipulates on a screen a graphical object using an input device, for example. It is then determined in step 702 whether the size of the object has changed. If so, another determination is made in step 704 whether there has been a size increase. In this case, the volume of the audio source represented by the modified graphical object is increased in step 706; otherwise, the audio output level is decreased in step 708.

It is then determined in step 710 whether the location of the graphical object has changed. If so, the audio output level in each channel is adjusted in step 712 in accordance with the movement of the object. The process then returns to step 700 to repeat the above operation.

FIGS. 1–6 show the display screen 100 under the control of a microprocessor 10. It will be appreciated that the microprocessor 10 or any other programmable controller may be programmed to effect the operations of the present invention as described above with reference to FIGS. 1–6 and in accordance with the flowchart operation of FIG. 7. As stated above, the system according to the present invention may be a dedicated, stand-alone audio system having a screen for displaying graphical objects, an input device for manipulating them on the screen, and at least one programmable controller effecting various operations of the system. Alternatively, the audio system may be under the control of a separate computer system, such as a personal computer, coupled therewith for performing the above operations.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An apparatus for controlling a plurality of sounds each corresponding to a respective graphical object on a display screen, said apparatus comprising:

a controllable processor programmed to select on said display screen a respective graphical object corresponding to a desired sound, each graphical object containing an image for visually identifying a sound in said plurality of sounds, said controllable processor further being programmed to effect modification of one or more parameters associated with said sound by moving said graphical object on said display screen, wherein the size of said graphical object is modified to depict the modification of at least one of said one or more parameters and the size modification is performed simultaneous to the movement of said graphical object, and wherein said controllable processor is programmed to effect disablement of said desired sound by moving said graphical object to a predetermined area of said display screen.

2. A method for controlling a plurality of sounds each corresponding to a respective graphical object on a display screen, comprising the steps of:

selecting on said display screen a respective graphical object corresponding to a desired sound, each graphical object containing an image for visually identifying a sound in said plurality of sounds; and effecting modification of one or more parameters associated with said sound by moving said graphical object on said display screen, wherein the size of said graphical object is modified to depict the modification of at least one of said one or more parameters and the size modification is performed simultaneous to the movement of said graphical object, wherein said desired sound is disabled by moving said graphical object to a predetermined area of said display screen.

3. A method for controlling a plurality of sounds by manipulating a plurality of graphical objects, each corresponding to a respective sound, on a display screen, comprising the steps of:

selecting on said display screen a graphical object corresponding to a desired sound, each graphical object containing an image for visually identifying a sound in said plurality of sounds; and effecting modification of a level of said sound by moving said graphical object on said display screen, wherein the size of said graphical object is modified to depict the modification of said level and the size modification is performed simultaneous to the movement of said graphical objects wherein said desired sound is disabled by moving said graphical object to a predetermined area of said display screen.

4. The method according to claim 3, wherein the size modification includes one of enlarging or reducing the selected graphical object.

5. The method according to claim 4, wherein said level is increased if said size of the selected graphical object is enlarged, and wherein said level is decreased if said size of the selected graphical object is reduced.

6. The method according to claim 5, wherein said level is no longer increased if said level has reached a maximum predetermined threshold corresponding to a maximum predetermined size of the selected graphical object, and wherein said level is no longer decreased if said level has reached a minimum predetermined threshold corresponding to a minimum predetermined size of the selected graphical object.

7. A method for controlling a plurality of sounds by manipulating a plurality of graphical objects, each corresponding to a respective sound, on a display screen, comprising the steps of:

providing on said display screen a graphical representation of multiple sound levels for said plurality of sounds;

selecting on said display screen a graphical object corresponding to a desired sound, each graphical object containing an image for visually identifying a sound in said plurality of sounds; and effecting modification of a level of said desired sound by moving the selected graphical object on said display screen between said multiple sound levels such that a sound level is changed in correspondence with the movement, wherein the size of said graphical object is modified to depict the modification of said level and the size modification is performed simultaneous to the movement of said graphical object, wherein said desired sound is disabled by moving said graphical object to a predetermined area of said display screen.

8. The method according to claim 7, wherein said sound level is increased if the selected graphical object is moved vertically from a first location to a second location on said display screen which are indicative of said multiple sound levels, and wherein said sound level is decreased if the selected graphical object is moved vertically from said second location to said first location.

9. The method according to claim 8, wherein said level is no longer increased if a maximum predetermined sound level has been reached corresponding to a maximum predetermined level on said display screen, and wherein said sound level is no longer decreased if a minimum predetermined sound level has been reached corresponding to a minimum predetermined level on said display screen.

10. A method for controlling a plurality of sounds reproduced via at least a right and left channel by manipulating a plurality of graphical objects, each corresponding to a respective sound, on a display screen, comprising the steps of:

selecting on said display screen a graphical object corresponding to a desired sound, each graphical object containing an image for visually identifying a sound in said plurality of sounds;

effecting modification of a parameter associated with said desired sound, other than the balance between left and right audio channels, by moving said graphical object on said display screen, wherein the size of said graphical object is modified to depict the modification of said parameter and the size modification is performed simultaneous to the movement of said graphical object; and moving said graphical object between left and right edges of said display screen such that a sound balance changes between said left and right channels in correspondence with the movement between the left and right edges, wherein said desired sound is disabled by moving said graphical object to a predetermined area of said display screen.

11. The method according to claim 10, wherein a center of said display screen represents a sound having an equal volume level in said left and right channels.

12. A method for controlling a plurality of sounds reproduced via at least a right and left channel by manipulating a plurality of graphical objects, each corresponding to a respective sound, on a display screen, comprising the steps of:

selecting on said display screen a graphical object corresponding to a desired sound, each graphical object containing an image for visually identifying a sound in said plurality of sounds;

moving said selected graphical object between left and right edges of said display screen such that a balance between said left and right channels of said desired sound changes in correspondence with the movement between the left and right edges; and effecting modification of a level of said desired sound by moving said graphical object on said display screen, wherein the size of said graphical object is modified to depict the modification of said level and the size modification is performed simultaneous to the movement of said graphical object, wherein said desired sound is disabled by moving said graphical object to a predetermined area of said display screen.

13. The method according to claim 12, wherein the modification includes one of enlarging or reducing a size of the selected graphical object.

14. The method according to claim 13, wherein said sound level is increased if said size of the selected graphical object is enlarged, and wherein said sound level is decreased if said size of the selected graphical object is reduced.

15. The method according to claim 12, wherein a predetermined center position of said display screen represents said desired sound having an equal volume level in said left and right channels.

16. The method according to claim 12, wherein said graphical object located at a predetermined center position of said display screen corresponds to a 3-D reproduction of said plurality of sounds.

* * * * *